Feb. 27, 1940.    L. KAMENAROVIČ    2,192,084
TUNING GEAR FOR RADIO RECEIVING SETS
Filed June 19, 1937
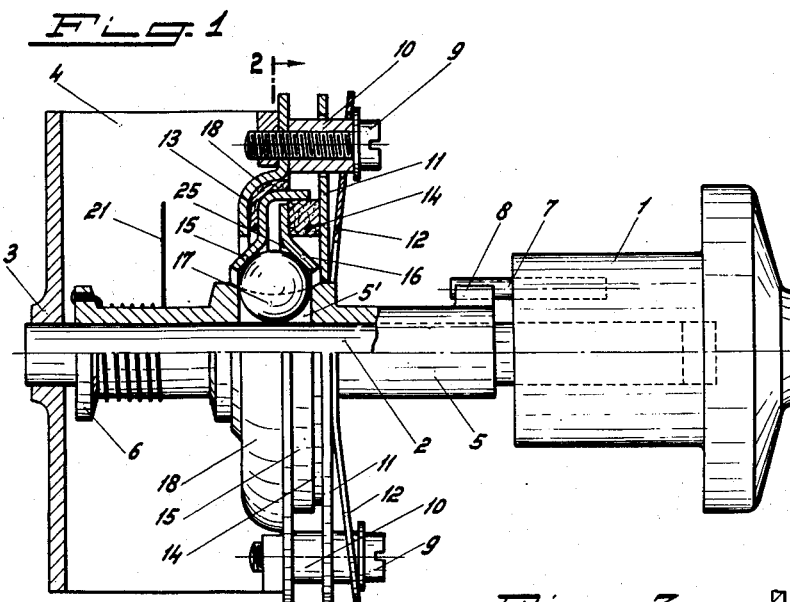
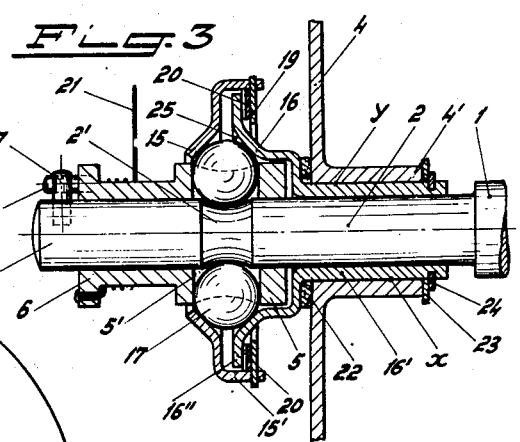
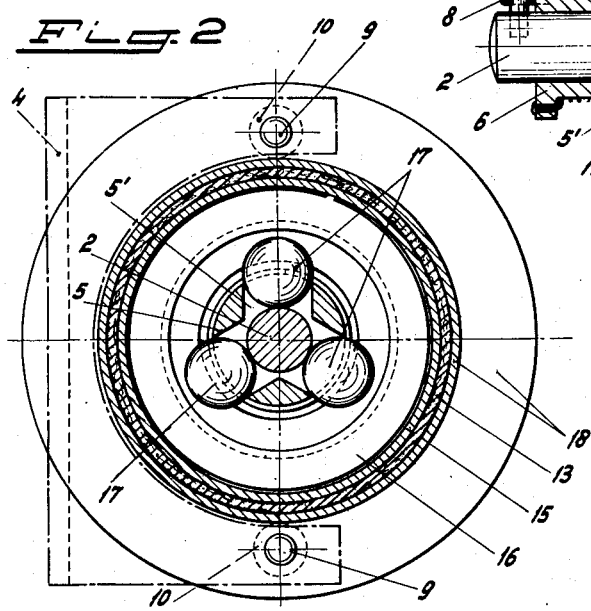
Inventor:
L. Kamenarović,
By E. F. Wenderoth
Atty Patented Feb. 27, 1940

2,192,084

UNITED STATES PATENT OFFICE 2,192,084

TUNING GEAR FOR RADIO RECEIVING SETS

Leone Kamenarovič, Milan, Italy, assignor to Fabbrica Italiana Magneti Marelli Società Anonima, Milan, Italy, a corporation of Italy Application June 19, 1937, Serial No. 149,236
In Italy June 25, 1936

5 Claims. (Cl. 74—10)

The present invention relates to two-ratio transmission gears for the tune control in radio receiving sets.

In the gear of this invention the control of the tuning means is effected under two different transmission ratios one of which is devoted to coarse tuning manipulations while the other one is devoted to vernier manipulations of said tuning means; for the above stated purpose said gear includes a rotatable tuning knob which co-operates with a certain angular lost motion with a part actuating the tuning means and a reducing gear operative on said part and having a frictionally slipping member this reducing gear being operative under the drive of said knob within the ranges of said lost motion thereof.

The present invention includes a simple construction with a reducing gear of planetary type which provides for a proper reducing ratio in the drive through it with a simple and small size arrangement; further it includes provisions for making the whole gear simple and for securing a satisfactory operation.

Two embodiments of the present invention are illustrated by way of example on the annexed drawing and Fig. 1 is a fragmentary longitudinal section of a first construction, Fig. 2 is a transverse section on line 2—2 of Fig. 1, and Fig. 3 is a fragmentary longitudinal section of a modified construction.

In construction of Figures 1 and 2 the tune control knob 1 is fast with a spindle 2 which is mounted to rotate in bearings as 3 of a stationary support frame 4; a sleeve 5 is loose on the shaft 2 and has a cord-winding drum 6 provided thereon, and a cord 21 devoted to the control of the tuning means and associate dial (not shown) is attached to said drum for being wound on and paid off from it.

The knob 1 is provided with a finger 7 adapted to engage a finger 8 extending from the sleeve 5 and having a restricted peripheral extent to provide for a wide angular lost motion of finger 7 and knob 1 with respect to finger 8 and sleeve 5.

A cup shaped rim 18 encircles the sleeve 5 and spindle 2 and is fastened on the frame 4 by means of screws 9 and spacing collars 10; an annular disc 11 is slidably supported on collars 10 adjacent the cup rim 18 and forced towards it by means of a spring spider 12 whose arms abut on the heads of screws 9 while the central annular portion of said spider exerts a pressure on the disc 11 to urge it towards the cup rim 18.

Two opposed conical rings 15 and 16 are located intermediate the cup 18 and disc 11 and friction linings 13 and 14 are located intermediate the cup 18 and ring 15 on one side and intermediate ring 16 and disc 11 on the other side; said rings 15 and 16 provide an intermediate groove 25 opening towards the spindle 2 and in register with said groove 25 the sleeve 5 has holes 5' in each of which is located a ball 17 engaging the opposite surfaces of spindle 2 and rings 15, 16.

In operation when the rotary knob 1 is manipulated in either direction, when its finger 7 engages directly the finger 8 of the sleeve 5 said sleeve 5 is driven directly by the knob 1 with the drum 6 and cord 21 and thus the coarse control of the tuning means and dial is obtained; in this operation the balls 17 are driven directly by the sleeve 5 being engaged in seats 5' thereof and with the spindle 2 and they drive in turn the rings 15 and 16 in rotation, said rings 15, 16 frictionally slipping over the respective linings 13 and 14.

To carry out the vernier tuning operation the knob 1 is manipulated in a direction to cause the finger 7 thereof to move off from the face of finger 8 contacted thereby. Then the sleeve 5 is released from knob 1 and said knob by means of the spindle 2 fast therewith causes a gyratory motion of the balls 17 within their seats 5' in the sleeve 5 said balls 17 thus rolling on the cooperating surfaces of rings 15 and 16; at this time the rings 15, 16 are stationary they being frictionally engaged by linings 13 and 14 which are clamped between the disc 11 and cup rim 18 under the action of the spring spider 12.

In these conditions the sleeve 5 and drum 6 are driven in revolution over spindle 2 by the planetary or gyratory operation of the balls 17 under the reducing ratio provided by the planetary gear consisting of parts 2, 17, 15, 16.

In the above described construction the part of the planetary gear which is to be stationary in the planetary operation (as rings 15, 16) is held stationary by separate means devoted to such purpose as linings 13 and 14, but this invention includes also an arrangement in which said part is held stationary for such purpose by the frictional action usually occurring between the several parts under the action of forces inherent to the operation of the gear, as the couple of reaction forces due to the pull of the cord operating the tuning means and dial.

A construction of this kind is illustrated in Fig. 3 in which the arrangement is substantially identical with that illustrated in Figures 1 and 2, the members being denoted by the references applied to equivalent ones of Figures 1 and 2. In the construction of Figure 3 the stationary parts 18, 9, 10, 11, 12 and friction linings 13, 14 are omitted, while the ring 16 which cooperates with ring 15 to provide the groove 25 where balls 17 are rolling during their planetary operation under the drive of knob 1, spindle 2 and spindle groove 2' where said balls 17 are engaged, and is located on the opposed side to drum 6 with respect to said balls 17 and associate ring 15, has a sleeve 16' rotatable in an extended bearing 4' of the stationary frame 4. In the described operation the pull developed on the drum 6 by the cord 21 connected with the tuning means and dial and return means therefor, develops a material couple of reaction forces operative in regions $x$ and $y$ of the bearing 4' and accordingly a material braking action intermediate the sleeve 16' and said bearing 4'.

In this construction the rings 15 and 16 are forced towards each other to engage the balls 17 intermediate them by means of a resilient corrugated or wave shaped ring 20 abutting on a flange 16'' of ring 16 and a ring 19 which in turn is engaged with a flanged rim 15' of ring 15.

When the knob 1 is manipulated with spindle 2 and the finger 7 fast with the spindle 2 and knob 1 engages the finger 8 of sleeve 5, the drum 6 is positively driven with sleeve 5, balls 17, rings 15 and 16 and sleeve 16' which slips within the bearing 4'; on the contrary during the vernier manipulation that is when the spindle 2 is caused by the operator's manipulation of knob 1 to rotate with respect to sleeve 5, the frictional engagement of parts 4' and 16' with each other is sufficient to hold the rings 15, 16 stationary and accordingly the balls 17 are caused to roll over said rings and to drive the sleeve 5 and drum 6 under a slow or reduced ratio.

The frictional engagement of the parts 16' and 4' may be magnified by means of suitable linings as 22 and 23 which are operative respectively intermediate the parts 16 and 4 and part 4' and a split annulus 24 fast on sleeve 16'.

In both constructions the drive of the tuning means and dial under the ratio provided for the vernier adjustment by the planetary gear occurs through an angle corresponding to a full revolution of the knob 1 more the angle through which the sleeve 5 has moved under the planetary action and less an angle depending upon the angular extents of fingers 7 and 8.

The tuning operation is effected by manipulating the knob 1 to carry the finger 7 into engagement with the finger 8 for rotation of the sleeve 5 and drum 6 in the direction in which the tuning means and dial are moved towards the desired tune position and said knob 1 and parts controlled thereby are further rotated in said direction until they are somewhat beyond the desired tuning position; then the knob 1 is operated in reverse direction to release the finger 7 from finger 8 and to carry out the vernier tune adjustment with the cooperation of the planetary gear until the correct tuning adjustment is secured.

What I claim as my invention and desire to secure by United States Letters Patent is:

1. A tuning control device for radio receivers comprising a manipulating knob, a part connected with said knob, a second part concentric with the first named part, planet means intermediate said parts, a driven member engaged with said planet means, connecting means engaged with said member for actuating the radio receiver tuning means and dial, means on said first named part and driven member for their direct interengagement with wide angular lost motion, a stationary part, said second part and stationary part having cooperating friction surfaces and said connecting means being operative on said member and second part to hold said friction surfaces interengaged and said second part stationary during the drive of said driven member through said planet means and to provide for slip motion of said second part when said knob and first-named part drive directly said driven member.

2. A tuning control device for radio receivers comprising a manipulating knob, a part connected with said knob, a second part concentric with the first named one, planet means intermediate said parts, a driven member engaged with said planet means, a cord operating the radio receiver tuning means and dial and operatively connected with said hollow member, means on said first named part and driven member for their direct interengagement with wide angular lost motion, a stationary part adjacent to said second part and friction means intermediate said stationary part and second part, said cord tensionally reacting on said member and second part to frictionally engage said second part with said friction means and to hold it stationary during the drive of said driven member through said planet means and to provide for slip motion of said second part when said knob and first named part drive directly said driven member.

3. A tuning control device for radio receivers comprising a manipulating knob, a spindle connected with said knob, a stationary part rotatably supporting said spindle, a hollow driven member on said spindle and having seats throughout it, a cord operating the radio receiver tuning means and dial and operatively connected with said hollow member, a rim encircling said driven member, planet balls in said seats and cooperating with said spindle and rim for planetary operation, a sleeve extending from said rim and embracing said spindle said stationary part and sleeve having cooperating frictional surfaces and said cord tensionally reacting on said driven member, spindle and sleeve to hold said friction surfaces interengaged, and means on said spindle and driven member for their direct interengagement with wide angular lost motion, said frictionally engaged rim sleeve and stationary part cooperating to hold said rim stationary during the drive of said driven member through said planet balls and to provide for slip motion of said rim when said knob and spindle drive directly said driven member.

4. A tuning control device for radio receivers comprising a manipulating knob, a spindle connected with said knob, a stationary part rotatably supporting said spindle, a hollow driven member on said spindle and having seats throughout it, a cord operating the radio receiver tuning means and dial and operatively connected with said hollow member, a rim encircling said driven member, planet balls in said seats and cooperating with said spindle and rim for planetary operation, friction means intermediate said stationary part and rim, a sleeve extending from said rim and embracing said spindle said stationary part and sleeve having cooperating frictional surfaces and said cord tensionally reacting on said driven member, spindle, rim and sleeve to hold said friction surfaces interengaged and said friction means operative, means on said spindle and driven member for their direct interengagement with wide angular lost motion, said friction means and surfaces cooperating to hold said rim stationary during the drive of said driven member through said planet balls and to provide for slip motion of said rim when said knob and spindle drive directly said driven member.

5. A tuning control device for radio receivers comprising a manipulating knob, a spindle connected with said knob, a stationary part rotatably supporting said spindle, a hollow driven member on said spindle and having seats throughout it, a cord operating the radio receiver tuning means and dial and operatively connected with said hollow member, a rim encircling said driven member, planet balls in said seats and cooperating with said spindle and rim for planetary operation, a sleeve extending from said rim and embracing said spindle said stationary part and sleeve having cooperating frictional surfaces, friction means intermediate said stationary part and rim and friction means intermediate said stationary part and sleeve, said cord tensionally reacting on said driven member, spindle, rim and sleeve to hold said friction surfaces interengaged and said friction means operative, means on said spindle and driven member for their direct interengagement with wide angular lost motion, said friction means and surfaces cooperating to hold said rim stationary during the drive of said driven member through said planet balls and to provide for slip motion of said rim when said knob and spindle drive directly said driven member.

LEONE KAMENAROVIĆ.